United States Patent [19]
Holliday

[11] 3,931,987
[45] Jan. 13, 1976

[54] TRAILER WITH MOVEABLE AXLE ASSEMBLY

[76] Inventor: Robert G. Holliday, 4517 S. Zeeb Road, Ann Arbor, Mich. 48103

[22] Filed: Mar. 24, 1975

[21] Appl. No.: 561,497

[52] U.S. Cl. ............... 280/80 B; 280/64; 267/20 R
[51] Int. Cl.² .......................................... B62D 27/04
[58] Field of Search ...... 280/62, 63, 64, 80 B, 81 R, 280/124 R; 180/14 R, 29, 24.01, 24.02; 267/20 R, 20 A

[56] References Cited
UNITED STATES PATENTS

| | | | |
|---|---|---|---|
| 2,336,814 | 12/1943 | Suter | 280/81 R X |
| 2,365,884 | 12/1944 | Kucera | 280/80 B |
| 2,387,093 | 10/1945 | Schmied | 280/80 B |
| 2,741,510 | 4/1956 | McCulloch | 280/63 X |
| 3,363,913 | 1/1968 | McFarland | 180/24.02 X |

*Primary Examiner*—M. H. Wood, Jr.
*Attorney, Agent, or Firm*—Olsen and Stephenson

[57] ABSTRACT

A trailer improvement wherein two trailers can be connected together, back-to-back, to double the load-carrying capacity, and the axle assemblies can be moved so that the wheels are in the proper location to assure that optimum mobility and load-carrying capacity of the interconnected trailer can be realized. The interconnected trailer can be separated and converted to two single trailers when desired.

10 Claims, 9 Drawing Figures

TRAILER WITH MOVEABLE AXLE ASSEMBLY

BACKGROUND OF THE INVENTION

The present invention relates to trailer improvements, and especially to improvements in trailers for hauling snowmobiles.

It is conventional practice to haul a pair of snowmobiles in parallel arrangement on a trailer that has a flat trailer bed supported midway of its ends on a pair of wheels and connected at its front end to the hitch of a motor vehicle. This practice is convenient when two snowmobilists desire to travel together to a place of use, hauling their snowmobiles by one motor vehicle. However, problems are created when more than two snowmobilists desire to travel together in this manner. According to practices followed heretofore, either the additional snowmobiles were required to be stacked vertically above the first two snowmobiles on the trailer, or a second trailer was required that would be connected by its tongue to the rear of the first trailer. Both of these arrangements create obvious problems from convenience, cost and safety considerations. To avoid tandem trailers, the tongue of the second trailer can be removed and the front of the second trailer connected directly to the rear of the first trailer, but an arrangement such as this significantly reduces the mobility of the trailer and increases substantially the wear of tires from skidding and the like when attempting to turn or traveling around curves on the road.

SUMMARY OF THE INVENTION

The present invention has overcome the inadequacies of prior trailer arrangements or constructions for hauling more than two snowmobiles by a single tow vehicle.

According to one form of the present invention, a trailer is provided comprising a trailer bed, an axle assembly having an axle shaft and wheels journaled at each end of the axle shaft, the axle shaft assembly being pivotally mounted on the trailer bed for movement between a first position wherein the axle assembly is forward of the pivotal mounting so that the wheels are located under and substantially midway of the length of the trailer bed and a second position wherein the axle assembly is rearward of the pivotal mounting so that the wheels are located adjacent to and toward the rear end of the trailer bed. By virtue of this construction and arrangement, two trailers can be connected back-to-back, with the tongue of the second trailer removed or folded, and with both of the axle shaft assemblies pivoted to their second positions so that the dual wheel assemblies will then be located substantially midway of the length of the interconnected trailer beds. This arrangement will permit the interconnected trailer unit to be relatively mobile, and lateral skidding of the tires when turning the trailer is substantially eliminated.

Not only can the trailer units be readily connected together to double the carrying capacity thereof, but spring and/or shock absorber means are provided so that a single set of such spring and/or shock absorber units can be used with each axle assembly in either its first or second positions.

Thus, it is an object of the present invention to provide an improved trailer that can be interconnected with a second trailer to double the load-carrying capacity thereof and to provide optimum mobility and operational characteristics.

Other objects of this invention will appear in the following description and appended claims, reference being had to the accompanying drawings forming a part of this specification wherein like reference characters designate corresponding parts in the several views.

DESCRIPTION OF THE PREFERRED EMBODIMENT

Figure 1:
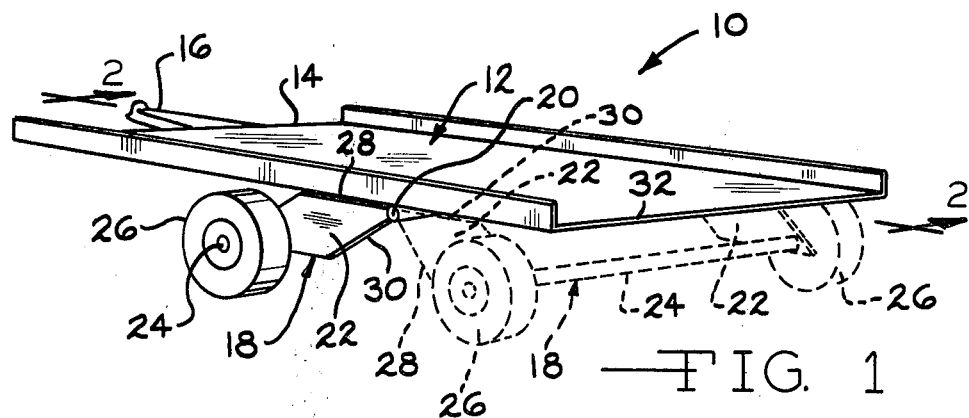
FIG. 1 is a perspective view of a trailer embodying the present invention, showing the axle assembly in solid lines in a first position for use when the trailer is hauled as a single unit, and in broken lines illustrating a second position for use when the trailer is interconnected with a second trailer.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, the invention will be described in greater detail. The first trailer 10 has a trailer bed 12 to which is attached at the front end 14 a tongue 16 for attachment to a tow vehicle, not shown. The trailer 10 has an axle assembly 18 pivotally mounted on the trailer bed 12 at 20.

The axle assembly 18 includes a pair of parallel side members 22 which define parallelograms. Each side member 22 is pivotally supported at an upper angle of the parallelogram at the pivot 20, and at the diagonally opposite lower angle an axle shaft 24 is mounted on which the wheels 26 are journaled for rotation.

When in the first position shown in solid lines in FIG. 1, one edge 28 of the parallelogram will be essentially parallel to and in supporting relationship with respect to the under side of the trailer bed 12, and when pivoted to the second position shown in broken lines, the adjacent edge 30 will be in a position substantially parallel to and in supporting relationship to the under side of the trailer bed 12.

Figure 3:
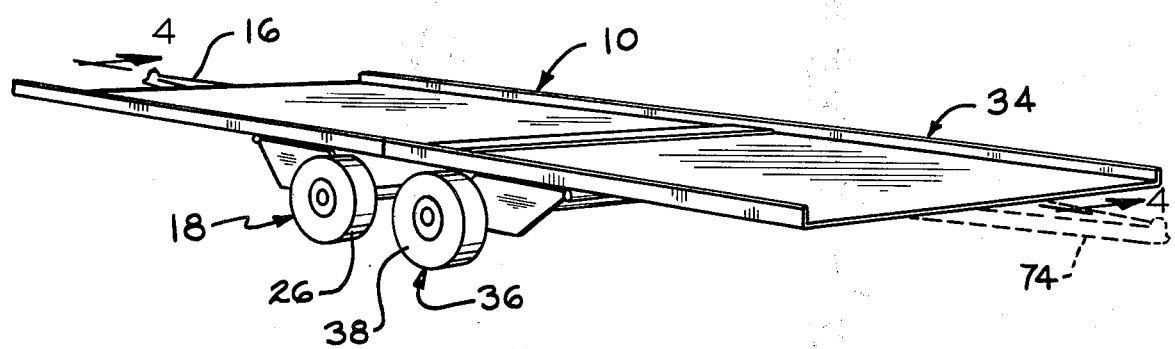
FIG. 3 is a perspective view showing two trailers connected back-to-back.
Figure 4:
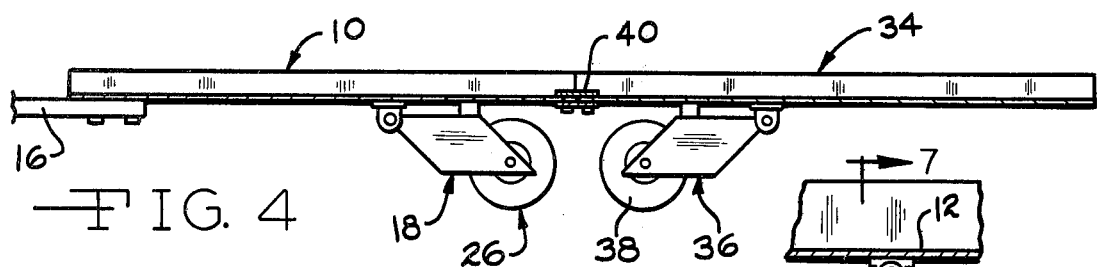
FIG. 4 is a sectional view taken on the lines 4—4 of FIG. 3.

As can be seen best in FIG. 1, when the axle assembly 18 is in its first position, the wheels 26 will be essentially midway between the front end 14 and the rear end 32 of the trailer bed 12 so that they will be in the most favorable position for supporting a load on the trailer bed, such as a pair of snowmobiles extending lengthwise thereon. When the axle assembly 18 is pivoted to the second position shown in broken lines, the wheels 26 will be adjacent to the rear end 32 of the trailer 10 so that when a second trailer is connected, back-to-back, thereto as shown in FIG. 3, the axle assemblies 18 and 36 will be located so that their wheels 26 and 38 are closely adjacent to one another substantially midway of the length of the interconnected trailers 10 and 34. When two such trailers 10 and 34 are connected back-to-back, a suitable coupler bracket assembly 40 will be used to secure the trailers together, as is shown in FIG. 4.

Figure 2:
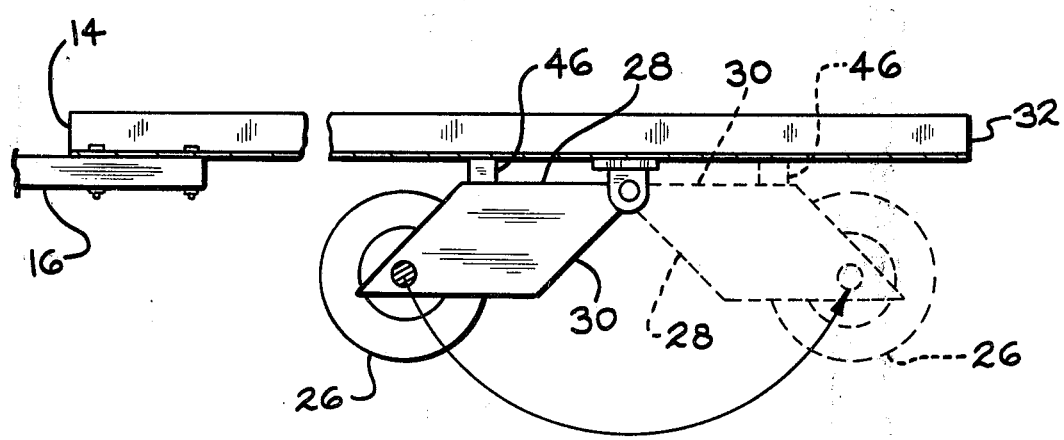
FIG. 2 is a fragmentary side elevational view showing the axle assembly in its first and second positions.

To provide spring means or other suitable cushioning apparatus between the axle assembly 18 and the trailer bed 12, suitable sockets 42 and 44 are provided at the edges 28 and 30 into which the spring means 46 can be inserted in accordance with the position of the axle assembly 18. When the axle assembly is in the second position shown in FIG. 5, the spring means 46 will be located in the sockets 44, and when the axle assembly is in the first position shown in solid lines in FIG. 2, the spring means 46 will be located in the sockets 42.

Figure 5:
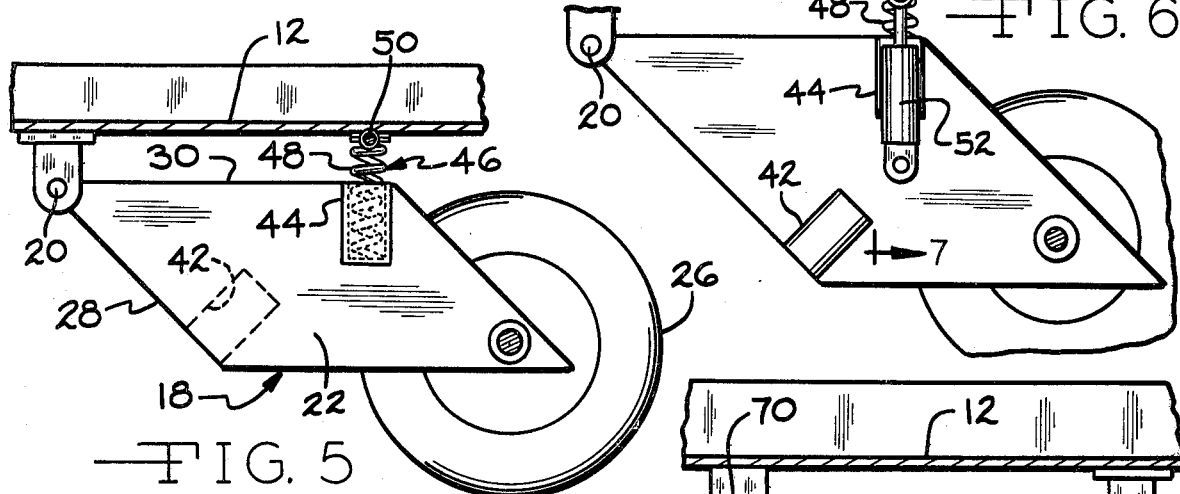
FIG. 5 is a fragmentary vertical sectional view taken lengthwise through the bed of the trailer showing details of one embodiment of the axle assembly and its spring means.
Figure 7:
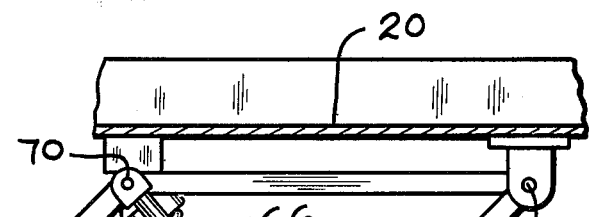
FIG. 7 is a fragmentary sectional view taken on the lines 7—7 of FIG. 6.

The spring means 46 comprises two coil springs 48 only one of which is shown, the coil springs 48 being interconnected by a transverse bar 50, shown best in FIGS. 5 and 7. When it is desired to pivot the axle assembly 18 to either its first or second positions, the spring means 46 can be removed from the socket 42 or 44 during the pivoting operation and can be inserted into the other socket which will be uppermost so as to provide the desired spring support between the axle assembly 18 and the trailer bed 12.

Figure 6:
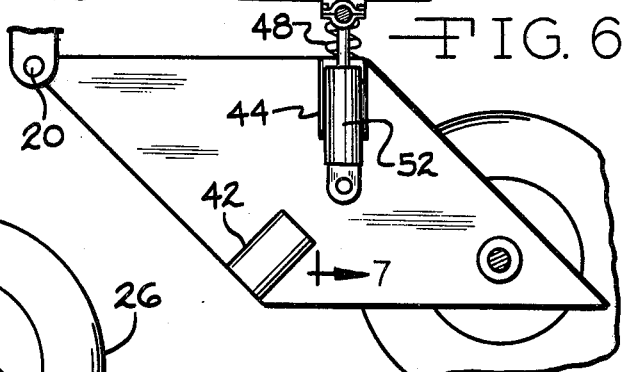
FIG. 6 is a similar fragmentary sectional view showing a shock absorber used together with the spring means.

As shown in FIGS. 6 and 7, a shock absorber 52 can also be pivotally mounted on each side member 22 and connected at the upper end at 54 to the transverse bar 50 if a shock absorber of this type is desired.

Figure 8:
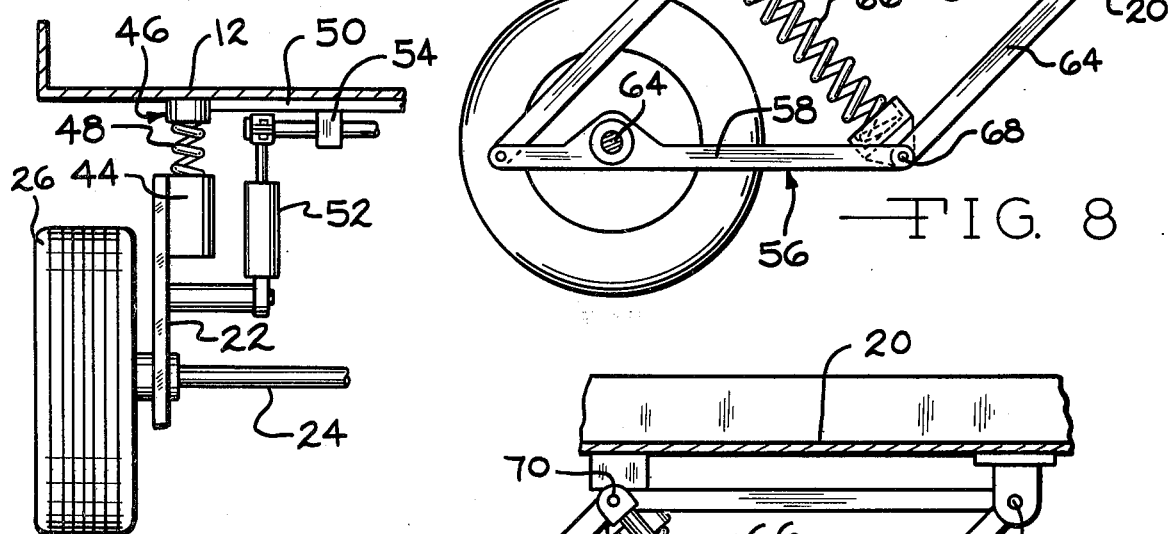
FIG. 8 is a vertical sectional view similar to FIG. 5, but showing a modified form of the axle assembly.
Figure 9:
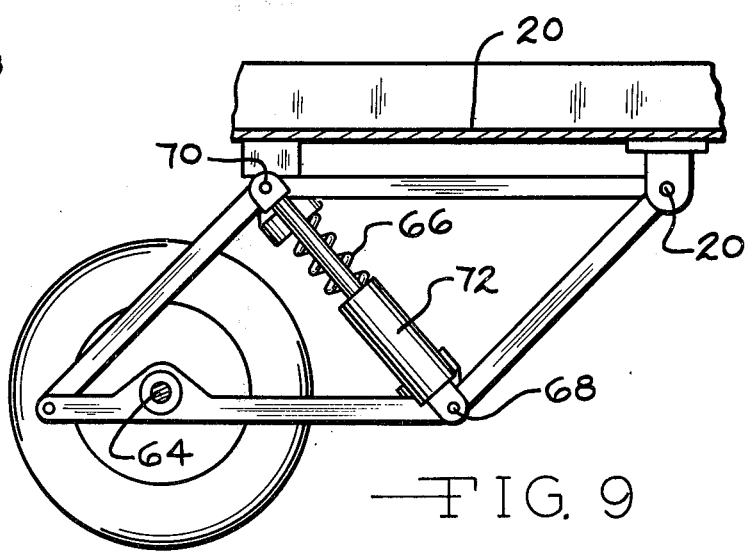
FIG. 9 is a fragmentary sectional view similar to FIG. 8, but showing another modification wherein a shock absorber is used in conjunction with the spring means.

In FIGS. 1–7, inclusive, the side member 22 is a rigid parallelogram which can be in the form of a sheet metal plate or the like. As shown in FIGS. 8 and 9, the side member 56 may be an articulate frame having four hingedly connected side members 58, 60, 62 and 64. The articulate frame member 56 is pivotally connected at 20 to the trailer bed 12 and the axle assembly 64 is connected to the parallelogram at the diagonally opposite connection between the side members 58 and 60. A compression spring means 66 extends between the hinged connections 68 and 70 urging the hinged connections 68 and 70 apart so that the articulate frame 56 can flex but will maintain essentially the position shown in FIG. 8.

FIG. 9 illustrates the addition of the shock absorber 72 which also may be connected between the hinged connections 68 and 70. It will be recognized that the axle assemblies shown in FIGS. 8 and 9 are in their forward or first positions, and they can readily be pivoted to the rearward or second positions and the spring means 66 and the shock absorber 72 will continue to function in the same capacity in the second positions.

From the foregoing descriptions, it will be readily apparent that an improved trailer has been provided which can be interconnected with a second trailer to double the load-carrying capacity of the interconnected unit. By virtue of the pivotal mounting of the axle assemblies to the trailer beds, the wheels can be located close together in positions substantially midway between the opposite ends of the interconnected unit so as to provide ease of handling and effective operation of the interconnected trailer unit.

While the invention has been described with respect to trailers primarily used in connection with hauling snowmobiles, it is to be understood that it applies to any type of two-wheel trailer adapted to be hauled by a tow vehicle where the capacity of the trailer is to be increased. Also, it is to be understood that when trailers 10 and 34 are connected, the tongue 74 of trailer 34 will be removed.

It is claimed:

1. A trailer comprising a trailer bed, an axle assembly having an axle shaft and wheels journaled at each end of the axle shaft, said axle assembly being pivotally mounted about a transverse axis on said trailer bed for movement between a first position wherein the axle assembly is forward of the pivotal mounting so that the wheels are located under and substantially midway of the length of the trailer bed and a second position wherein the axle assembly is rearward of the pivotal mounting so that the wheels are located under and adjacent to the rear end of the trailer bed.

2. The trailer that is defined in claim 1, wherein said axle assembly includes a pair of parallel side members defining parallelograms, said axle assembly being pivotally mounted on said trailer bed at the upper acute angle of each parallelogram, said axle shaft being connected to the parallelogram at the lower acute angle of each parallelogram, the upper side of each parallelogram being in supporting engagement with the trailer bed.

3. The trailer that is defined in claim 2, wherein each of said parallelograms is a rigid member.

4. The trailer that is defined in claim 2, wherein each of said parallelograms is an articulate frame having four hingedly connected sides and with spring means connected to and extending between the obtuse angles of the parallelograms.

5. The trailer that is defined in claim 2, wherein each of the sides of parallelogram forming said upper acute angle has a socket therein, and a spring means is positioned in the socket of each parallelogram that is located in the side of the parallelogram adjacent to the trailer bed and is in engagement with said trailer bed.

6. The trailer that is defined in claim 5, wherein each parallelogram has a shock absorber pivotally mounted thereon for engagement with the trailer bed when the axle assembly is in either of its positions.

7. The trailer that is defined in claim 2, wherein each of said parallelograms is an articulate frame having four hingedly connected side members, and connected between the hinge connections of frame at the obtuse angles thereof is a load support spring means and an associated shock absorber.

8. In combination, a first trailer comprising a trailer bed having a tongue connected to its front end, an axle assembly having an axle shaft and wheels mounted at each end of the axle shaft, said axle assembly being pivotally mounted on said trailer bed for movement between a first position wherein the axle assembly is forward of the pivotal mounting so that the wheels are located under and substantially midway under the length of the trailer bed and a second position wherein the axle assembly is rearward of the pivotal mounting so that the wheels are located under and adjacent to the rear end of the trailer bed, and a second trailer constructed the same as said first trailer having its rear end connected to the rear end of said first trailer, said axle assembly of each trailer being pivoted to its second position.

9. The combination that is defined in claim 8, wherein the tongue of said second trailer is disconnected from the front end of the trailer bed.

10. The combination that is defined in claim 8, wherein said axle assemblies supportingly engage their associated trailer beds at locations substantially above their associated wheels.

* * * * *